(12) United States Patent
Nordstrom

(10) Patent No.: US 9,565,974 B2
(45) Date of Patent: Feb. 14, 2017

(54) CULINARY DEVICE

(71) Applicant: Christopher Andrew Nordstrom, Boston, MA (US)

(72) Inventor: Christopher Andrew Nordstrom, Boston, MA (US)

( * ) Notice: Subject to any disclaimer, the term of this patent is extended or adjusted under 35 U.S.C. 154(b) by 442 days.

(21) Appl. No.: 13/961,252

(22) Filed: Aug. 7, 2013

(65) Prior Publication Data

US 2014/0042685 A1 Feb. 13, 2014

Related U.S. Application Data

(60) Provisional application No. 61/681,374, filed on Aug. 9, 2012.

(51) Int. Cl.
| | |
|---|---|
| *B23Q 3/00* | (2006.01) |
| *A47J 47/00* | (2006.01) |
| *B26D 7/20* | (2006.01) |
| *A47J 47/16* | (2006.01) |

(52) U.S. Cl.
CPC ............... *A47J 47/005* (2013.01); *A47J 47/16* (2013.01); *B26D 7/20* (2013.01)

(58) Field of Classification Search
USPC .................................................. 269/289 R
See application file for complete search history.

(56) References Cited

U.S. PATENT DOCUMENTS

| | | | | |
|---|---|---|---|---|
| 888,294 A | * | 5/1908 | Affleck ................ | A47J 47/005 269/13 |
| 4,653,737 A | * | 3/1987 | Haskins ............... | A47J 47/005 269/13 |
| 4,765,619 A | * | 8/1988 | Cooper ................ | A47B 25/003 473/496 |
| 4,838,180 A | * | 6/1989 | Gutgsell .............. | A47B 3/0911 108/132 |
| 4,884,714 A | * | 12/1989 | Bechtel ................ | A47J 47/20 206/818 |
| 5,031,975 A | * | 7/1991 | Anderson ............. | A47J 47/005 108/20 |
| 5,192,053 A | * | 3/1993 | Sehlstedt ............. | B66F 7/08 182/69.5 |
| 5,226,621 A | * | 7/1993 | Skoff .................... | B65B 67/12 108/26 |

(Continued)

FOREIGN PATENT DOCUMENTS

CA 2449313 A1 * 5/2005 ............ A47J 47/005

OTHER PUBLICATIONS

Author Unknown, "Progressive International Over the Sink Cutting Board, Red and White," Chef Talk, Aug. 2012, 1 page, http://www.cheftalk.com/products/progressive-international-over-the-sink-cutting-board-red-and-white.

(Continued)

*Primary Examiner* — Alvin Grant
(74) *Attorney, Agent, or Firm* — Withrow & Terranova, PLLC

(57) ABSTRACT

A culinary device that includes a planar first member that forms a throughhole and a planar second member. A multi-position coupling mechanism couples the planar first member with respect to the planar second member, and allows the planar second member to be moved from a first position with respect to the planar first member to a second position with respect to the planar first member.

20 Claims, 7 Drawing Sheets

(56) References Cited

U.S. PATENT DOCUMENTS

| | | | | |
|---|---|---|---|---|
| 5,546,852 A * | 8/1996 | Bidwell | A47J 47/005 | 210/259 |
| 5,572,934 A * | 11/1996 | Aldridge | A47B 37/00 | 108/24 |
| 5,836,575 A * | 11/1998 | Robinson | H01L 21/68764 | 108/138 |
| 6,026,972 A * | 2/2000 | Makowski | A47J 47/005 | 220/495.08 |
| 6,206,445 B1 * | 3/2001 | Brooks | A47J 47/005 | 296/39.2 |
| 6,359,239 B1 * | 3/2002 | Missler | A47J 47/005 | 177/177 |
| 6,427,607 B1 * | 8/2002 | Palmer | A47G 21/08 | 108/43 |
| 6,745,702 B2 * | 6/2004 | Goldberg | B65F 1/10 | 108/24 |
| 7,044,553 B2 * | 5/2006 | Ropp | B60N 2/508 | 297/313 |
| 7,048,236 B2 * | 5/2006 | Benden | A47B 21/0314 | 108/138 |
| 7,246,784 B1 * | 7/2007 | Lopez | A47B 51/00 | 108/145 |
| 7,290,490 B2 * | 11/2007 | Goldberg | A47B 23/001 | 108/24 |
| 7,415,785 B1 * | 8/2008 | Morgan | D05C 1/04 | 38/102.2 |
| 7,849,789 B1 * | 12/2010 | Whelan | A22C 17/0013 | 108/116 |
| 8,113,127 B2 * | 2/2012 | Helline | A47B 13/16 | 108/26 |
| 8,459,476 B2 * | 6/2013 | Malekmadani | A47B 87/0223 | 211/134 |
| 8,672,277 B2 * | 3/2014 | Hsu | F16M 11/10 | 248/121 |
| 8,844,894 B2 * | 9/2014 | Archambault | B60N 2/508 | 248/421 |
| 2001/0040328 A1 * | 11/2001 | Keener | A47J 47/005 | 269/289 R |
| 2003/0227119 A1 * | 12/2003 | Jackson | A47J 47/005 | 269/25 |
| 2004/0144906 A1 * | 7/2004 | Hill | B60N 2/502 | 248/421 |
| 2004/0189062 A1 * | 9/2004 | Knight | A45F 4/02 | 297/188.08 |
| 2006/0137379 A1 * | 6/2006 | Cawthon | A22C 17/08 | 62/285 |
| 2006/0254472 A1 * | 11/2006 | Goldberg | A47B 23/001 | 108/50.11 |
| 2007/0001359 A1 * | 1/2007 | Pearl | A47J 47/005 | 269/289 R |
| 2007/0044228 A1 * | 3/2007 | Fulks | A47J 47/005 | 4/631 |
| 2007/0080487 A1 * | 4/2007 | Yartz | A47J 47/005 | 269/289 R |
| 2010/0117428 A1 * | 5/2010 | Deml | B60N 2/502 | 297/344.15 |
| 2014/0318874 A1 * | 10/2014 | Moses | G01G 19/414 | 177/1 |

OTHER PUBLICATIONS

Author Unknown, "Cutting Board," Healthy Living, Aug. 2012, 1 page.

* cited by examiner

CULINARY DEVICE

RELATED APPLICATIONS

This application claims the benefit of provisional patent application Ser. No. 61/681,374, filed Aug. 9, 2012, the disclosure of which is hereby incorporated herein by reference in its entirety.

TECHNICAL FIELD

The embodiments relate to a culinary device, and in particular to a cutting board that includes multiple planar surfaces coupled with respect to one another, and an opening in one planar surface to allow food to be easily transported from the planar surface.

BACKGROUND

Culinary devices, such as cutting boards, are frequently used for meal preparation. A food product is typically placed on a cutting board and cut into multiple food pieces. The food pieces are then transferred from the cutting board to a container. One transfer mechanism involves lifting the cutting board and placing the cutting board in a position with respect to the container such that the food pieces may be scraped from the cutting board to the container. With a larger cutting board this can be awkward or difficult. If a knife is used to scrape the material from the cutting board to the container, this may also be dangerous.

Another transfer mechanism involves gathering the food pieces by hand and transporting them by hand to the container. Food pieces are often inadvertently dropped during this process, and the chef may need to clean or at least rinse their hands after transporting each different food product from the cutting board to the container. When preparing a meal that involves multiple food products, such as during preparation of a salad, this process may occur repeatedly.

SUMMARY

The present embodiments relate to a culinary device for cutting a food product into multiple food pieces that eases the transportation of the food pieces from the cutting surface. In one embodiment, a culinary device includes an upper member having an upper member top surface and an upper member bottom surface. The upper member forms a first opening that extends through the upper member from the upper member top surface to the upper member bottom surface. The culinary device includes a lower member that has a lower member top surface. A coupling mechanism couples the upper member to the lower member, and has a folded state and an opened state, wherein in the opened state the lower member is positioned a first distance from the upper member, and in the folded state the lower member is positioned a second distance from the upper member, the second distance being less than the first distance.

In one embodiment, the coupling mechanism comprises a plurality of arms. Each arm comprises an upper member end portion pivotally coupled to the upper member and a lower member end portion pivotally coupled to the lower member.

In another embodiment, the coupling mechanism comprises a plurality of telescoping arms. Each telescoping arm comprises an upper member end portion fixedly coupled to the upper member and a lower member end portion fixedly coupled to the lower member.

In one embodiment, the first opening formed in the upper member is positioned over the lower member top surface with the lower coupling mechanism in the opened state, such that food pieces pushed from the upper member top surface into the first opening drop onto the lower member top surface, or into a container positioned between the first opening and the lower member top surface.

In one embodiment, the coupling mechanism comprises a scale. The scale may include a wireless module configured to wirelessly communicate a measurement at a particular wireless frequency. The culinary device may also include a display device that may receive from the wireless module a measurement, such as a weight of a food product.

In one embodiment, the upper member may form a plurality of openings that extend through the upper member from the upper member top surface to the upper member bottom surface.

In one embodiment, the culinary device may include a container coupling mechanism configured to couple a removable container to the upper member. In one embodiment, the container coupling mechanism comprises a first threaded portion formed in a surface of the upper member that defines the first opening, and the container may comprise a second threaded portion configured to threadably engage the first threaded portion.

In another embodiment, the container coupling mechanism may comprise a slotted receiving member positioned on the upper member bottom surface. The slotted receiving member may be configured to receive a container comprising an opening and a lip configured to slide within the slotted receiving portion.

In one embodiment, the upper member includes a counter overhang portion and a sink overhang portion. The counter overhang portion has a mass substantially greater than the sink overhang portion to allow the lower member to be suspended in the sink without causing the upper member to move from a plane that is parallel to a plane of a countertop.

In another embodiment, the culinary device includes a planar first member forming a throughhole, a planar second member, and a multi-position coupling mechanism that couples the planar first member with respect to the planar second member, and allows the planar second member to be moved from a first position with respect to the planar first member to a second position with respect to the planar first member.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
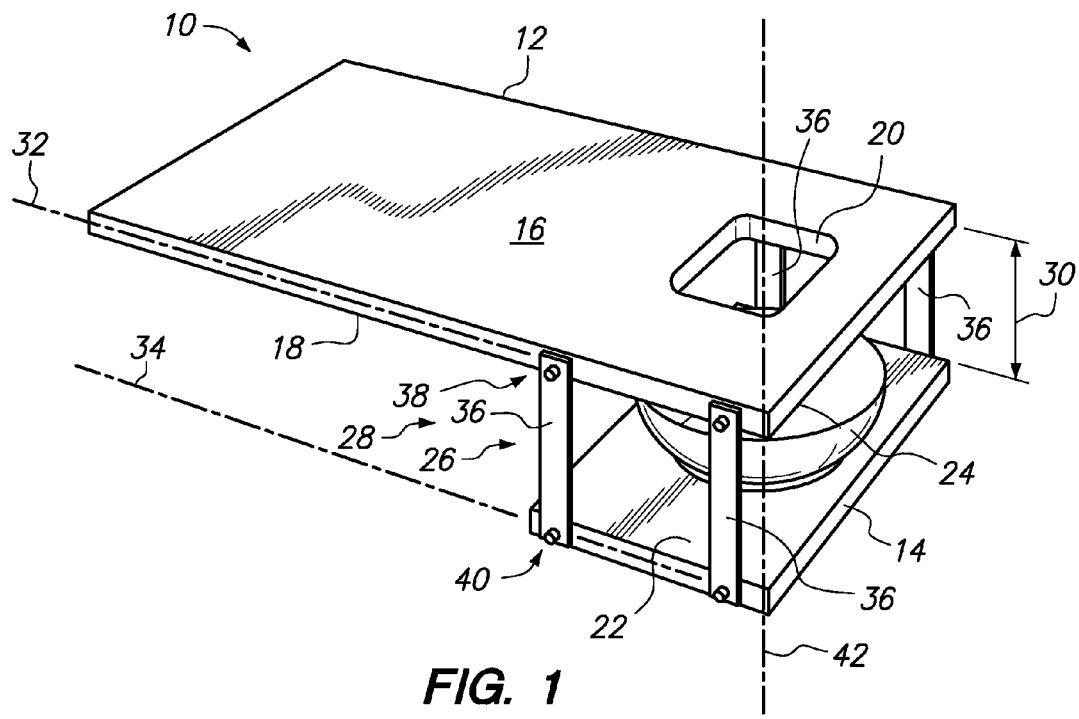
FIG. 1 is a perspective view of a culinary device according to one embodiment.

FIG. 1 is a perspective view of a culinary device 10 according to one embodiment. The culinary device 10 includes an upper member 12, which may also be referred to as a planar first member, and a lower member 14, which may also be referred to as a planar second member. The upper member 12 includes an upper member top surface 16 and an upper member bottom surface 18. The upper member 12 forms a first opening 20 that extends through the upper member 12 from the upper member top surface 16 to the upper member bottom surface 18. The lower member 14 includes a lower member top surface 22. As will be discussed in greater detail, a container 24 may rest on the lower member top surface 22 and catch food pieces that fall through the first opening 20.

The culinary device 10 also includes a coupling mechanism 26 that couples the upper member 12 to the lower member 14. The coupling mechanism 26 has an opened state 28 and a folded state (illustrated in FIG. 2). When in the opened state 28, the lower member 14 is positioned a first distance 30 from the upper member 12. The first distance 30 may be design dependent, but in some embodiments, the first distance 30 is sufficient to allow the container 24 to be positioned on the lower member top surface 22, but less than the depth of a sink, such that when in the opened state 28, the upper member 12 may rest on a counter top, and the lower member 14 may extend into a sink without touching a bottom of the sink.

When in the opened state, the upper member 12 is in a first plane 32 and the lower member 14 is in a second plane 34 that is parallel to the first plane 32.

The upper member 12 may be made of any suitable material, including, for example, a synthetic or organic material such as wood, plastic, stone, metal, plant fiber, or the like. The upper member 12 may comprise one or more layers that may include a variety of different materials, such as, for example, a wood core with a plastic upper member top surface 16.

The upper member 12 may comprise any suitable shape including, for example, a square, a rectangle, a circle, an oval, or the like. In some embodiments, the upper member top surface 16 includes one or more elements that help facilitate the directional transfer of cut material, such as a central groove (not illustrated) that creates a channel or trough to help direct desired food contents into the container 24 while any waste material may be diverted to another channel that facilitates transfer to a sink or a disposal.

The upper member top surface 16 may include raised edges to help contain cut material, retain water or other liquids, retain drips from raw meat, or the like. Such edges may be of any desired height and thickness, and may be positioned around the entire perimeter of the upper member top surface 16 or may only partially circumscribe the upper member top surface 16.

In one embodiment the coupling mechanism 26 comprises a plurality of arms 36. Each arm 36 includes an upper end portion 38 that is pivotally coupled to the upper member 12, and a lower end portion 40 that is pivotally coupled to the lower member 14. When the coupling mechanism 26 is in the opened state 28, an axis 42 extending perpendicularly through the first opening 20 extends through the lower member top surface 22.

Figure 2:
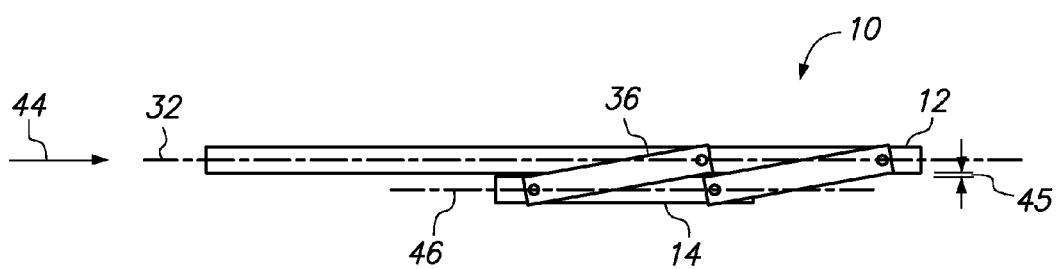
FIG. 2 is a perspective view of the culinary device illustrated in FIG. 1 shown in a folded state.

FIG. 2 is a perspective view of the culinary device 10 illustrated in FIG. 1 shown in a folded state 44. When in the folded state 44, the lower member 14 may be in a third plane 46 that is parallel to the first plane 32 of the upper member 12, and is positioned a second distance 45 from the upper member 12. The second distance 45 is less than the first distance 30 (FIG. 1), and thus when in the folded state 44, the culinary device 10 takes up substantially less space than when in the opened state 28 for storage purposes. In some embodiments, when in the folded state 44, the lower member top surface 22 may contact the upper member bottom surface 18. In some embodiments, the arms 36 may pivot freely with respect to the upper member 12 and the lower member 14 such that merely picking up the culinary device 10 results in the coupling mechanism 26 moving from the folded state 44 to the opened state 28 by virtue of gravity.

In one embodiment, the coupling mechanism 26 is a multi-position coupling member that couples the upper member 12 with respect to the lower member 14 and allows the lower member 14 to be moved from a first position with respect to the upper member 12 to a second position with respect to the upper member 12.

Figure 3:
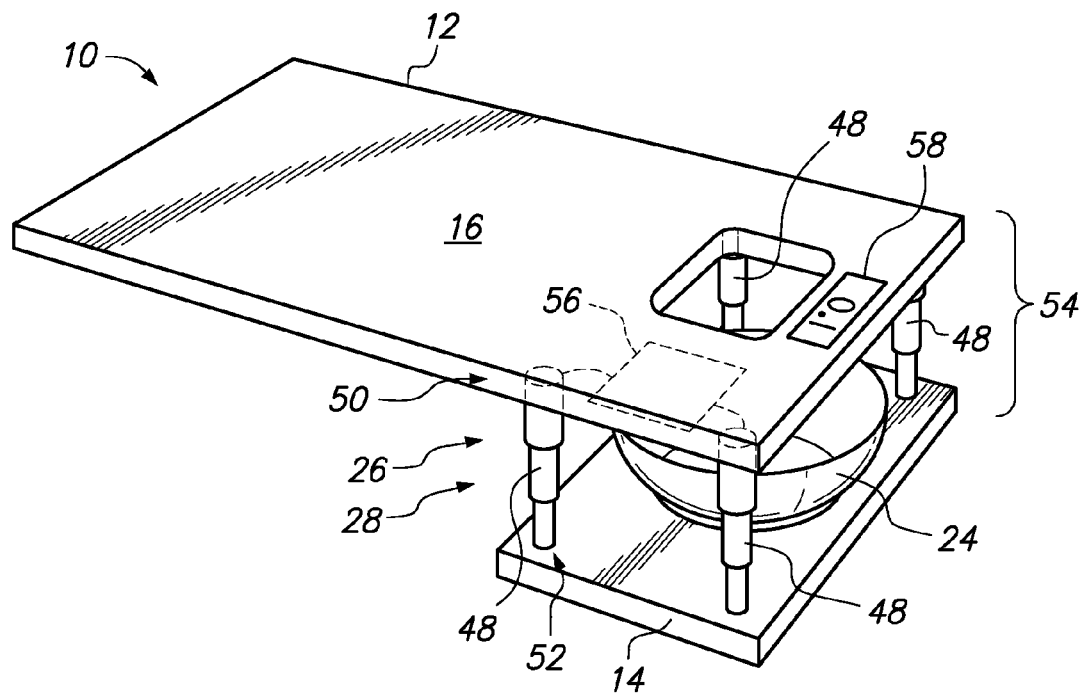
FIG. 3 is a perspective view of the culinary device according to another embodiment.

FIG. 3 is a perspective view of the culinary device 10 according to another embodiment. In this embodiment, the coupling mechanism 26 includes a plurality of telescoping arms 48. Each telescoping arm 48 includes an upper end portion 50 fixedly coupled to the upper member 12 and a lower end portion 52 fixedly coupled to the lower member 14. As illustrated in FIG. 3, the coupling mechanism 26 is in the opened state 28.

In one embodiment, the coupling mechanism 26 comprises a scale 54. The scale 54 may include an electronic module 56 that is configured to wirelessly communicate a measurement, such as a weight, at a particular wireless frequency. The measurement may be received by a wireless device, such as a smartphone (not illustrated) and displayed to a user. Alternatively or in addition, the culinary device 10 may include a display device 58. The electronic module 56 may be communicatively coupled to the display device 58 and configured to communicate the measurement to the display device 58 for display to the user. In some embodiments, the electronic module 56 may be hard-wired to the display device 58.

Figure 4:
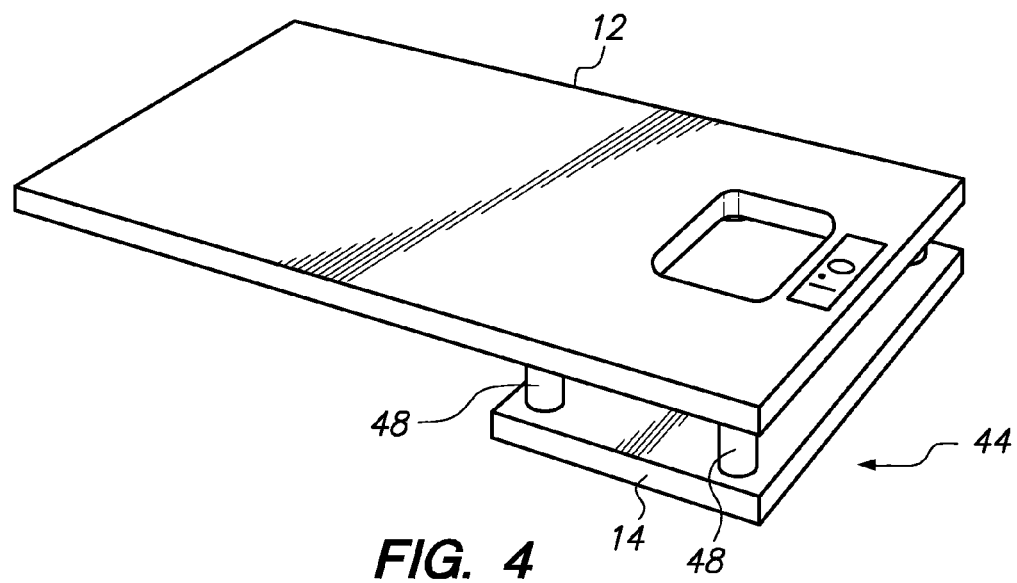
FIG. 4 is a perspective view of the culinary device illustrated in FIG. 3 shown in the folded state.

FIG. 4 is a perspective view of the culinary device 10 illustrated in FIG. 3 shown in the folded state 44. The telescoping arms 48 may freely telescope with gravity such that when the culinary device 10 is lifted, the lower member 14 telescopes to the opened state 28 via gravity. In other embodiments, the telescoping arms 48 may only telescope when an additional force is applied to urge the lower member 14 from the folded state 44 to the opened state 28. In addition, in some embodiments the coupling mechanism 26 may provide stops or detents that allow the lower member 14 to be positioned a desired distance from the upper member 12 to allow the culinary device 10 to accommodate different depths of different sinks.

Figure 5:
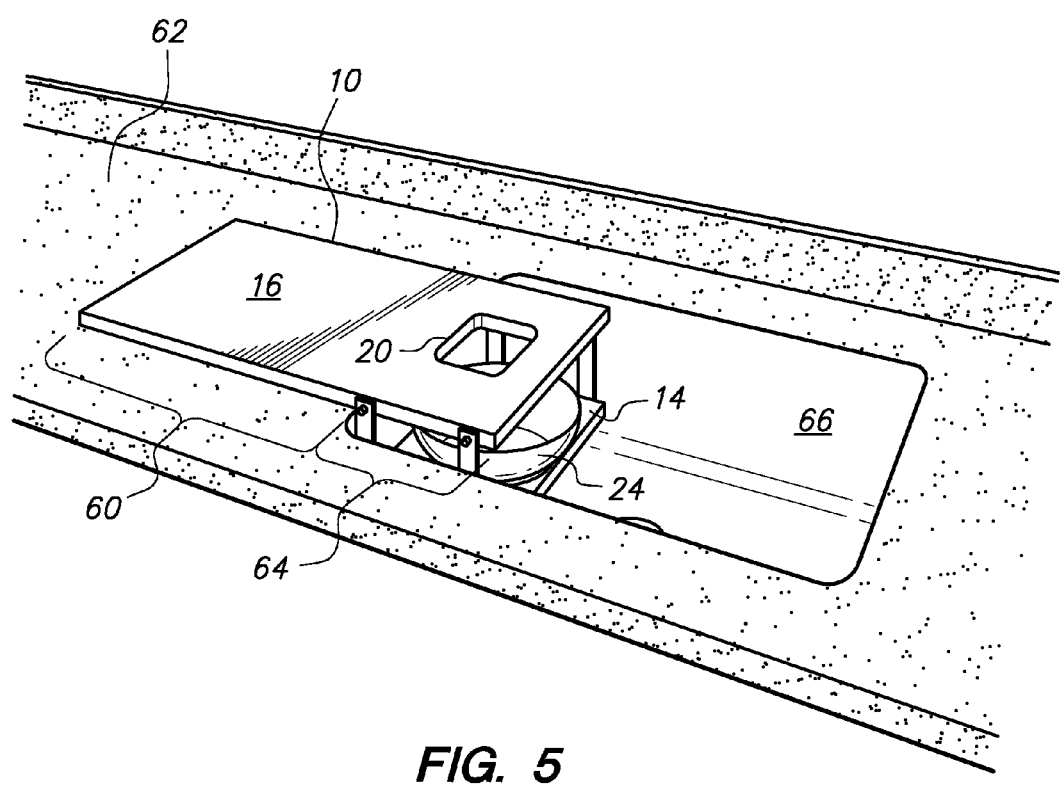
FIG. 5 is a top view of the culinary device in a position for use in a kitchen, according to one embodiment.

FIG. 5 is a top view of the culinary device 10 in a position for use in a kitchen. In this embodiment, the culinary device 10 includes a counter overhang portion 60 that rests on a counter 62 and a sink overhang portion 64 that extends into a sink 66. Preferably, the lower member 14 does not make contact with the interior surface of the sink 66 when in the opened state 28. The counter overhang portion 60 may be substantially heavier than the sink overhang portion 64 to inhibit tilting of the culinary device 10 into the sink 66. In some embodiments, the counter overhang portion 60 may have a weight embedded therein to resist tilting of the culinary device 10 into the sink 66 when in use. Alternatively, or in addition, the counter overhang portion 60 may have significantly more area size than that of the sink overhang portion 64 such that the counter overhang portion 60 is substantially heavier than the sink overhang portion 64.

FIG. 5 illustrates the container 24 resting on the lower member 14. In use, food urged from the upper member top surface 16 into the first opening 20 falls into the container 24, eliminating the need to lift the culinary device 10 in order to transfer food pieces from the upper member top surface 16 to the container 24, and eliminating the need to contact the food pieces with a user's hands.

Figure 6:
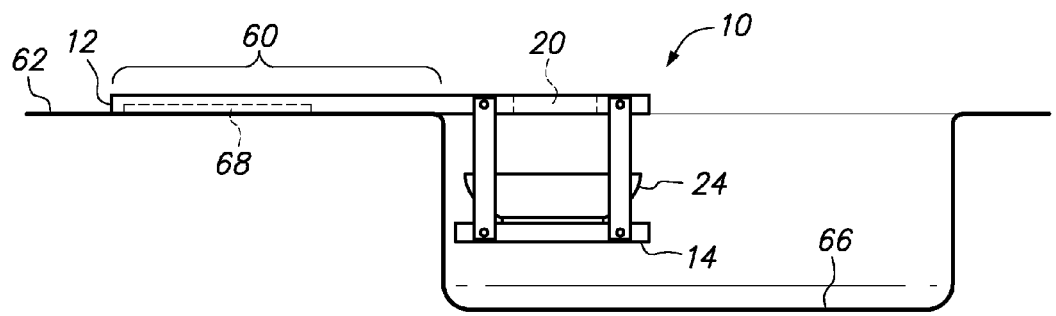
FIG. 6 is a side view of the culinary device in a position for use according to one embodiment.

FIG. 6 is a side view of the culinary device 10 in a position for use according to one embodiment. In this embodiment, the counter overhang portion 60 includes a weighted mass 68 embedded therein to ensure that the upper member 12 stays in a plane that is parallel to the plane of the counter 62 when in use.

Figure 7:
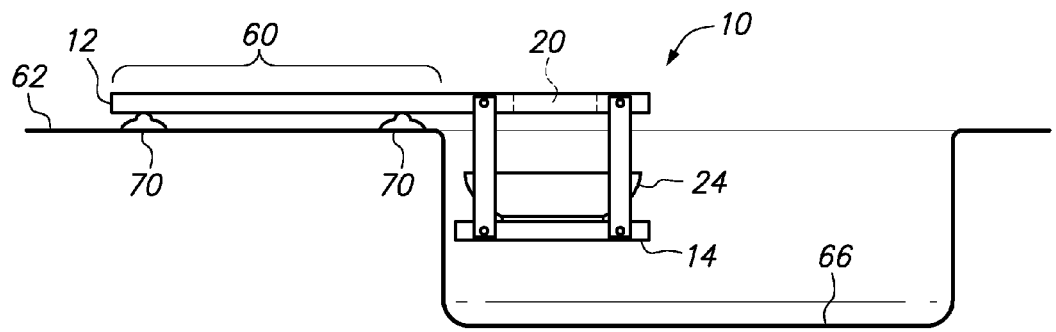
FIG. 7 is a side view of the culinary device in a position for use according to another embodiment.

FIG. 7 is a side view of the culinary device 10 in a position for use according to another embodiment. In this embodiment, the counter overhang portion 60 includes one or more suction cups 70 to ensure that the upper member 12 stays in a plane that is parallel to the plane of the counter 62 when in use, and does not tilt into the sink 66.

Figure 8:
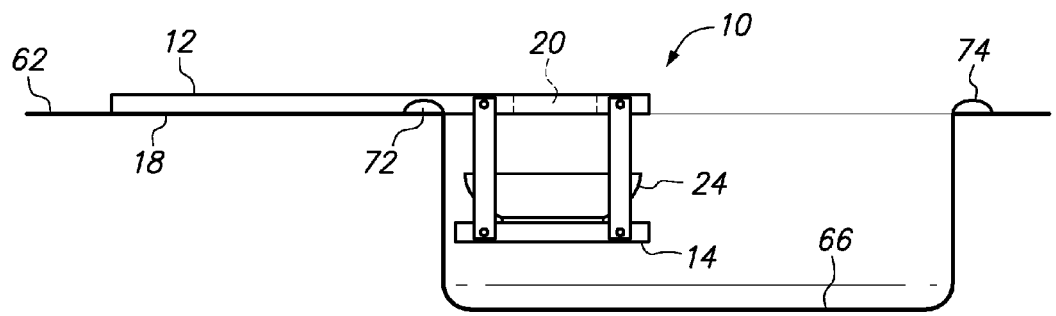
FIG. 8 is a side view of the culinary device in a position for use according to another embodiment.

FIG. 8 is a side view of the culinary device 10 in a position for use according to another embodiment. In this embodiment, the upper member bottom surface 18 may have a groove 72 formed therein to accommodate a lip 74 about the opening of the sink 66 that rises above the planar surface of the counter 62. Alternatively, or in addition, the upper member bottom surface 18 may include a compressible material that compresses upon contact with the lip 74 and thereby facilitates contact between the upper member bottom surface 18 and the counter 62 to prevent wobbling or other undesirable movement of the culinary device 10.

Figure 9:
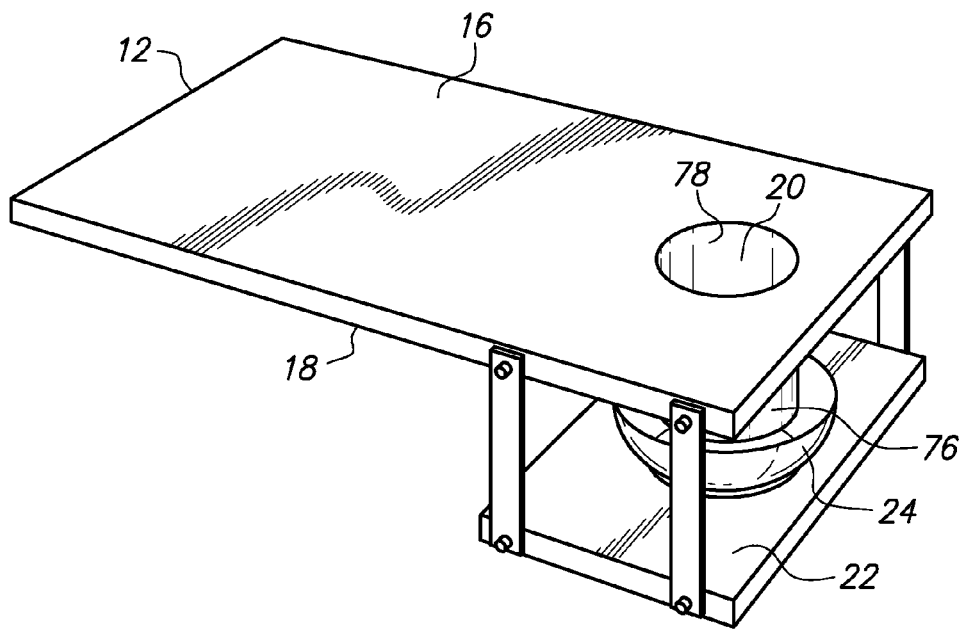
FIG. 9 is a perspective view of the culinary device according to another embodiment.

FIG. 9 is a perspective view of the culinary device 10 according to another embodiment. In this embodiment, the upper member 12 includes a hollow tube 76 positioned on the upper member bottom surface 18 and extending in a direction toward the lower member top surface 22 when the lower member 14 is in the opened state 28. The hollow tube 76 has a tube opening 78 in communication with the first opening 20. Food pieces from the upper member top surface 16 are transferred into the first opening 20, travel through the hollow tube 76, and fall onto the lower member top surface 22, or into a container 24 resting on the lower member top surface 22.

Figure 10:
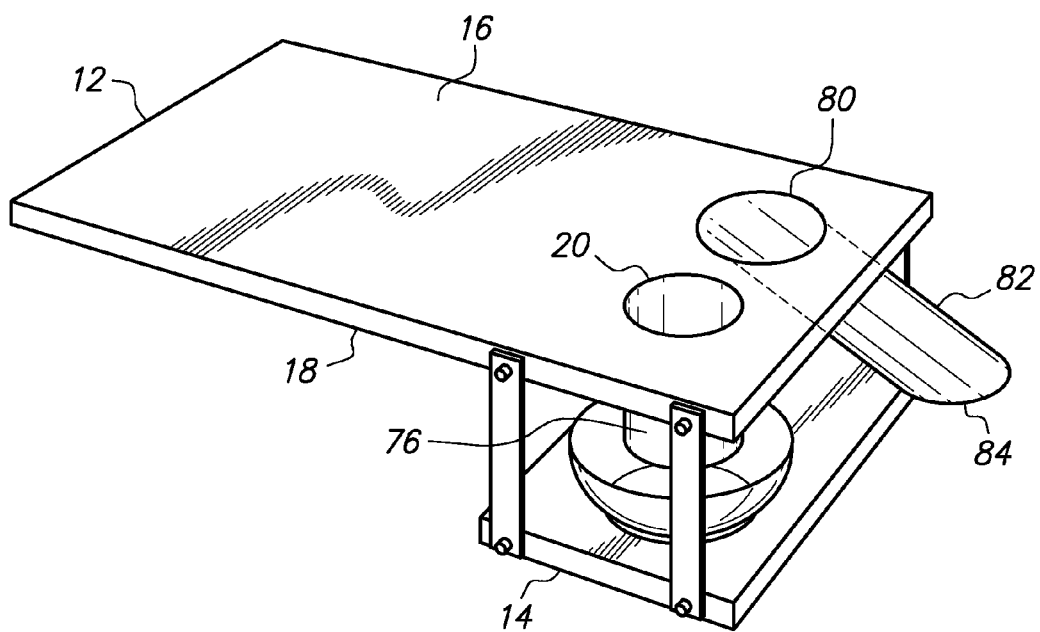
FIG. 10 is a perspective view of the culinary device according to another embodiment.

FIG. 10 is a perspective view of the culinary device 10 according to another embodiment. In this embodiment, the upper member 12 forms the first opening 20 and a second opening 80. The hollow tube 76 may be in contact with the upper member bottom surface 18 and be positioned under the first opening 20 to facilitate directing food pieces urged into the first opening 20 in a direction toward the lower member 14. A hollow tube 82 may be in contact with the upper member bottom surface 18 and be positioned under the second opening 80 and have an exit opening 84 that directs food pieces into the sink 66, or otherwise away from the lower member 14. Thus, the hollow tube 76 extends from the upper member bottom surface 18 and is configured to direct food pieces urged into the first opening 20 in a direction toward the lower member 14, and the hollow tube 82 extends from the upper member bottom surface 18 and is configured to direct food pieces urged into the second opening 80 in a direction away from the lower member 14. This embodiment eases the transport of scraps from the upper member top surface 16. In other embodiments, the upper member 12 may contain any number of openings, such as three or more openings to allow different food pieces to be easily transported into separate containers 24.

Figure 11:
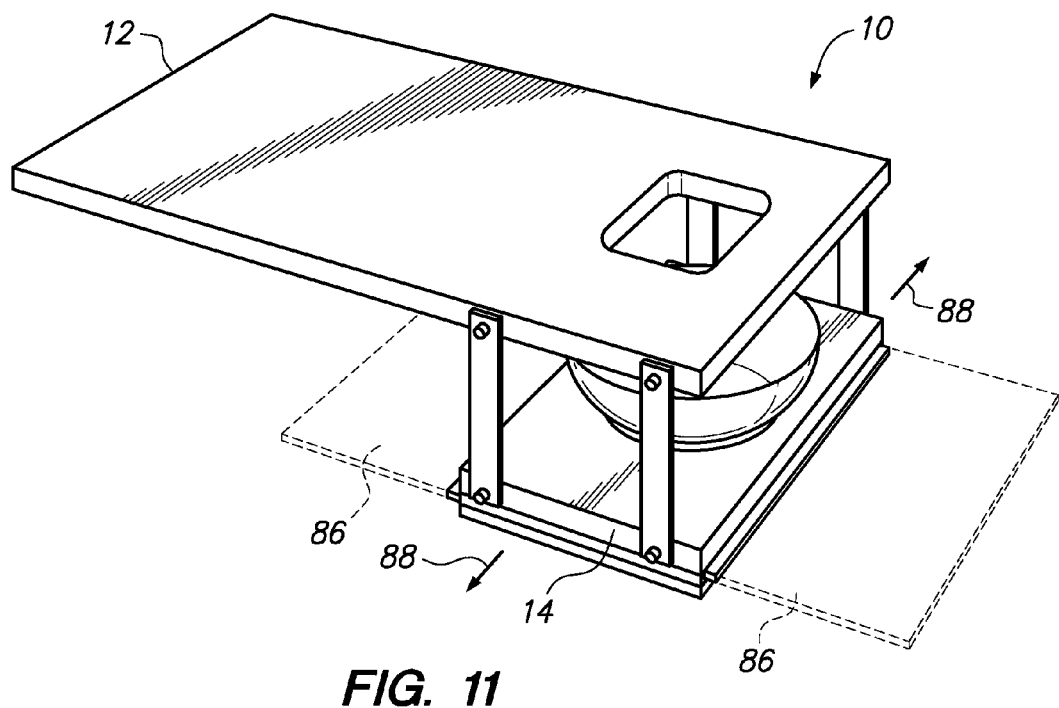
FIG. 11 is a perspective view of the culinary device according to another embodiment.

FIG. 11 is a diagrammatic view of the culinary device 10 according to another embodiment. In this embodiment, the lower member 14 includes expandable leaves 86 that allows a user to set the size of the lower member top surface 22 to a desired size when in use. The lower member 14 may also, or alternatively, include expandable leaves 86 that allow the lower member 14 to be expanded in directions 88.

Figure 12:
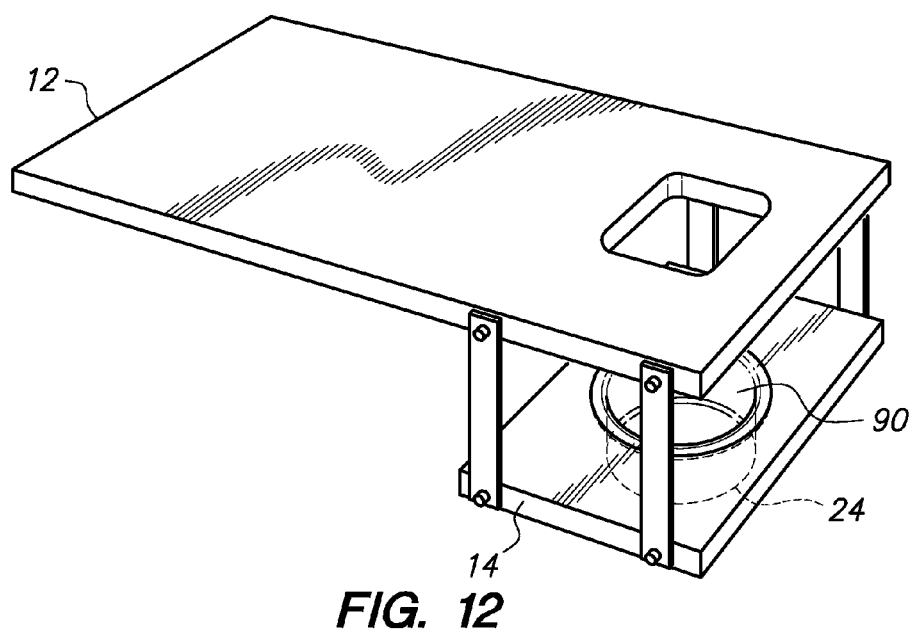
FIG. 12 is a perspective view of the lower member according to another embodiment.

FIG. 12 is a perspective view of the lower member 14 according to another embodiment. In this embodiment the lower member 14 includes an opening 90 that is fitted to retain the container 24 to inhibit substantial movement of the container 24 during use. Alternatively, the lower member 14 may form an inset or depression, in which the container 24 may be positioned.

Figure 13:
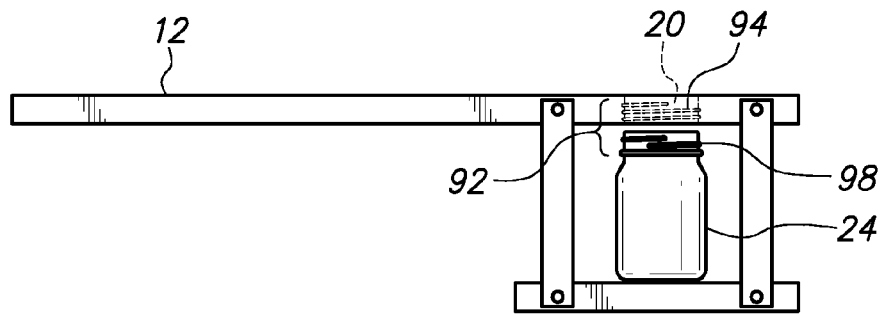
FIG. 13 is a perspective view of the culinary device according to another embodiment.

FIG. 13 is a perspective view of the culinary device 10 according to another embodiment. In this embodiment, a container coupling mechanism 92 comprises a first threaded portion 94 formed in an inner surface of the upper member 12 that defines the first opening 20. The container 24 also includes a second threaded portion 98 that is configured to threadably engage the first threaded portion 94.

Figure 14:
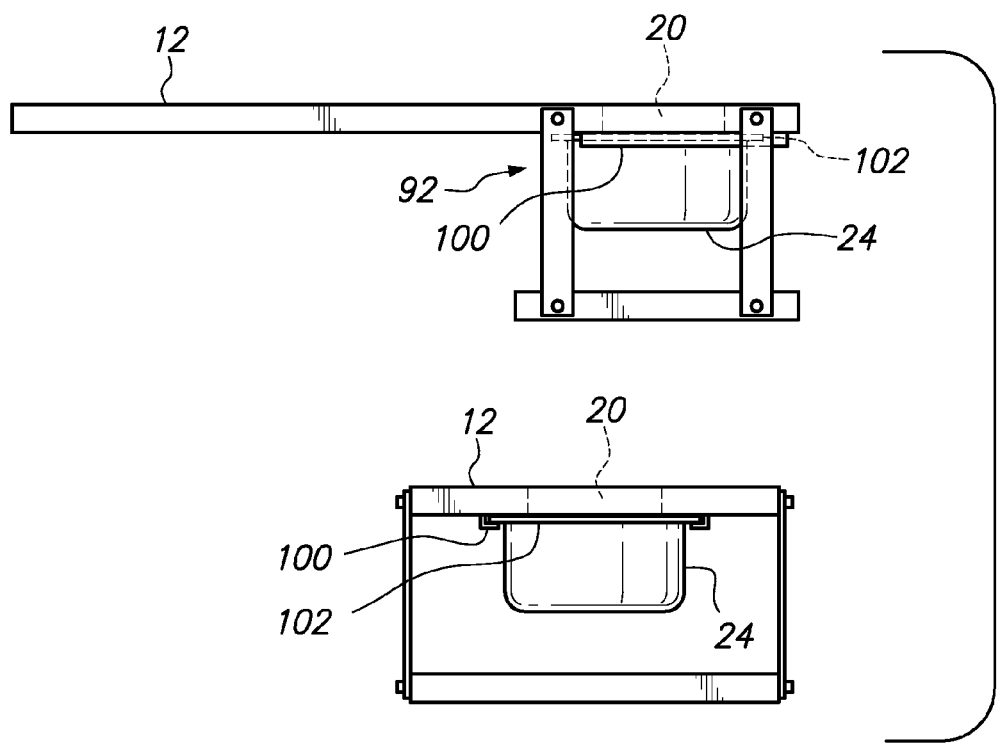
FIG. 14 is a perspective view of the culinary device according to another embodiment.

FIG. 14 is a perspective view of the culinary device 10 according to another embodiment. In this embodiment, the container coupling mechanism 92 comprises slotted receiving member 100 positioned on the upper member bottom surface 18 that is configured to receive a lip 102 of the container 24. The slotted receiving member 100 preferably includes a stop so that as the container 24 is positioned in the container coupling mechanism 92, the container 24 stops under the first opening 20.

In some embodiments, the upper member top surface 16 may include or comprise an antimicrobial material that limits or inhibits growth of microorganisms, and a sealant to facilitate a clean surface. The culinary device 10 may also include one or more handles to facilitate carrying or transport of the culinary device 10.

In one embodiment, the culinary device is self-standing such that the culinary device can sit securely on a counter top or other flat surface in an open state with the upper member positioned over the lower member top surface such that food pieces pushed from the upper member top surface into the first opening drop onto the lower member top surface, or into a container positioned between the first opening and the lower member top surface.

Those skilled in the art will recognize improvements and modifications to the preferred embodiments of the present disclosure. All such improvements and modifications are considered within the scope of the concepts disclosed herein and the claims that follow.

What is claimed is:

1. A culinary device, comprising:
    an upper member having an upper member top surface and an upper member bottom surface, the upper member comprising a counter overhang portion and a sink overhang portion, the counter overhang portion configured to engage a counter portion adjacent a sink, the sink overhang portion configured to be retained over the sink by the counter overhang portion, the sink overhang portion forming a first opening that extends through the upper member from the upper member top surface to the upper member bottom surface;
    a lower member having a lower member top surface; and
    a coupling mechanism coupled between the upper member and the lower member, the coupling mechanism movable between a folded state and an opened state, wherein moving the coupling mechanism to the opened state positions the lower member a first distance from the upper member, and moving the coupling mechanism to the folded state positions the lower member a second distance from the upper member, the second distance being less than the first distance.

2. The culinary device of claim 1, wherein moving the coupling mechanism to the opened state positions the upper member in a first plane and positions the lower member in a second plane that is parallel to the first plane, and moving the coupling mechanism to the folded state positions the lower member in a third plane that is parallel to the first plane.

3. The culinary device of claim 1, wherein the coupling mechanism comprises a plurality of arms, each arm comprising an upper end portion pivotally coupled to the upper member and a lower end portion pivotally coupled to the lower member.

4. The culinary device of claim 1, wherein the coupling mechanism comprises a plurality of telescoping arms, each telescoping arm comprising an upper end portion fixedly coupled to the upper member and a lower end portion fixedly coupled to the lower member.

5. The culinary device of claim 1, wherein the first opening defines an axis extending perpendicularly through the first opening and through the lower member top surface when the coupling mechanism is in the opened state.

6. The culinary device of claim 1, wherein when the coupling mechanism is in the folded state, the lower member top surface contacts the upper member bottom surface.

7. The culinary device of claim 1, wherein the coupling mechanism comprises a scale.

8. The culinary device of claim 7, wherein the scale comprises a wireless module configured to wirelessly communicate a measurement at a predetermined frequency.

9. The culinary device of claim 7, wherein the culinary device comprises a display device, and the scale is communicatively coupled to the display device and configured to communicate a measurement to the display device.

10. The culinary device of claim 1, wherein the upper member forms a second opening that extends through the upper member from the upper member top surface to the upper member bottom surface.

11. The culinary device of claim 10, further comprising:
    a first hollow tube extending from the upper member bottom surface and configured to direct food pieces urged into the first opening in a direction toward the lower member; and
    a second hollow tube extending from the upper member bottom surface and configured to direct food pieces urged into the second opening in a direction away from the lower member.

12. The culinary device of claim 1, further comprising a hollow tube positioned on the upper member bottom surface and extending in a direction toward the lower member top surface when the coupling mechanism is in the opened state, the hollow tube having a tube opening in communication with the first opening.

13. The culinary device of claim 1, further comprising a container coupling mechanism configured to removably couple a container to the upper member.

14. The culinary device of claim 13, further comprising the container, and wherein the container coupling mechanism comprises a first threaded portion formed in a surface of the upper member that defines the first opening, and wherein the container comprises a second threaded portion configured to threadably engage the first threaded portion.

15. The culinary device of claim 13, wherein the container coupling mechanism comprises a slotted receiving member positioned on the upper member bottom surface configured to receive a container comprising an opening and a lip.

16. The culinary device of claim 1, wherein the counter overhang portion has a mass substantially greater than the sink overhang portion to allow the sink overhang portion to be retained over the sink and to allow the lower member to be suspended in the sink by the sink overhang portion without causing the upper member to move from a plane that is parallel to a plane of a countertop.

17. The culinary device of claim 1, wherein the upper member bottom surface of the counter overhang portion comprises at least one suction cup configured to removably couple the upper member to a countertop to allow the sink overhang portion to be retained over the sink and to allow the lower member to be suspended in the sink.

18. The culinary device of claim 1, wherein the upper member top surface comprises a first area size, and the lower member top surface comprises a second area size, the second area size being less than the first area size.

19. A culinary device, comprising:
    an upper member having an upper member top surface and an upper member bottom surface, the upper member forming a first opening that extends through the upper member from the upper member top surface to the upper member bottom surface, the upper member forming a second opening that extends through the upper member from the upper member top surface to the upper member bottom surface;
    a lower member having a lower member top surface;
    a coupling mechanism coupled between the upper member and the lower member, the coupling mechanism movable between a folded state and an opened state, wherein moving the coupling mechanism to the opened state positions the lower member a first distance from the upper member, and moving the coupling mechanism to the folded state positions the lower member a second distance from the upper member, the second distance being less than the first distance;

a first hollow tube extending from the upper member bottom surface and configured to direct food pieces urged into the first opening in a direction toward the lower member; and a second hollow tube extending from the upper member bottom surface and configured to direct food pieces urged into the second opening in a direction away from the lower member.

20. A culinary device, comprising:

an upper member having an upper member top surface and an upper member bottom surface, the upper member forming a first opening that extends through the upper member from the upper member top surface to the upper member bottom surface;

a lower member having a lower member top surface;

a coupling mechanism coupled between the upper member and the lower member, the coupling mechanism movable between a folded state and an opened state, wherein moving the coupling mechanism to the opened state positions the lower member a first distance from the upper member, and moving the coupling mechanism to the folded state positions the lower member a second distance from the upper member, the second distance being less than the first distance;

a container; and a container coupling mechanism configured to removably couple the container to the upper member, wherein the container coupling mechanism comprises a first threaded portion formed in a surface of the upper member that defines the first opening, and wherein the container comprises a second threaded portion configured to threadably engage the first threaded portion.

* * * * *